United States Patent
Paul

(10) Patent No.: US 9,996,105 B1
(45) Date of Patent: Jun. 12, 2018

(54) HIGH PRECISION EVENT TIMING IN NETWORK DEVICES

(71) Applicant: Marvell Israel (M.I.S.L) Ltd., Yokneam (IL)

(72) Inventor: Gideon Paul, Modiin (IL)

(73) Assignee: MARVELL ISRAEL (M.I.S.L) LTD, Yokneam (IL)

( * ) Notice: Subject to any disclaimer, the term of this patent is extended or adjusted under 35 U.S.C. 154(b) by 650 days.

(21) Appl. No.: 14/208,856

(22) Filed: Mar. 13, 2014

Related U.S. Application Data

(60) Provisional application No. 61/784,334, filed on Mar. 14, 2013, provisional application No. 61/908,500, filed on Nov. 25, 2013.

(51) Int. Cl.
*G06F 1/04* (2006.01)
*G06F 1/14* (2006.01)

(52) U.S. Cl.
CPC ........................... *G06F 1/14* (2013.01)

(58) Field of Classification Search
CPC ...... G06F 1/3203; G06F 9/30014; G06F 1/08; G06F 1/12; G06F 1/26; G06F 1/32; H03L 7/1976; H03L 2207/50; H03L 7/1974; H03L 7/18; H03L 7/23; H03L 7/0992; H03L 2207/06; H03L 7/08; H03L 7/0802
See application file for complete search history.

(56) References Cited

U.S. PATENT DOCUMENTS

| | | | | |
|---|---|---|---|---|
| 6,360,343 | B1 * | 3/2002 | Turnquist | G01R 31/31935 714/725 |
| 8,564,345 | B2 * | 10/2013 | Yu | H03L 7/0818 327/156 |
| 8,943,352 | B1 * | 1/2015 | Warneke | G06F 1/3234 327/113 |
| 9,054,967 | B1 * | 6/2015 | Edsall | H04L 43/0852 |
| 9,319,054 | B2 * | 4/2016 | Webb, III | H04J 3/0697 |
| 2010/0074383 | A1 * | 3/2010 | Lee | H04J 3/0667 375/354 |
| 2011/0006818 | A1 * | 1/2011 | Takagi | H03L 7/085 327/147 |
| 2012/0139597 | A1 * | 6/2012 | Blondel | H04J 3/0632 327/162 |
| 2013/0077642 | A1 * | 3/2013 | Webb, III | H03L 7/1974 370/503 |
| 2013/0308658 | A1 * | 11/2013 | Le Pallec | H04J 3/0697 370/503 |

(Continued)

*Primary Examiner* — Thomas Lee
*Assistant Examiner* — Zhipeng Wang

(57) ABSTRACT

Systems and methods are provided for determining a clock time associated with an event at a higher precision than is attainable by a main clock signal. A system includes a plurality of processing modules distributed across an integrated circuit, a main clock signal being transmitted to ones of the plurality of processing modules at a main clock frequency. A plurality of sub-cycle frequency resolution modules are disposed in corresponding ones of the processing modules, the sub-cycle frequency modules generating sub-cycle phase indicators at a frequency that is greater than the main clock frequency, the sub-cycle frequency resolution modules being configured to receive the main clock signal and to determine a clock time of an event based on a combination of the main clock and the sub-cycle phase indicators.

19 Claims, 8 Drawing Sheets

(56) References Cited

U.S. PATENT DOCUMENTS

| | | | |
|---|---|---|---|
| 2013/0343409 A1* | 12/2013 | Haulin | H04J 3/0697 370/503 |
| 2014/0062551 A1* | 3/2014 | Bhaumik | H03L 7/0805 327/158 |
| 2014/0071784 A1* | 3/2014 | Baliga | G11C 8/18 365/233.13 |
| 2015/0200706 A1* | 7/2015 | Bottazzi | G01S 7/40 375/140 |
| 2016/0080138 A1* | 3/2016 | Biederman | H04L 7/0037 375/354 |

* cited by examiner

HIGH PRECISION EVENT TIMING IN NETWORK DEVICES

CROSS-REFERENCE TO RELATED APPLICATIONS

The present application claims priority from U.S. Provisional Application Ser. No. 61/784,334 entitled "Low Power Clock for Precision Time Protocol," filed 14 Mar. 2013 and U.S. Provisional Application Ser. No. 61/908,500 entitled "PTP Low Power Clock Solution," filed 25 Nov. 2013, the entirety of both of which is hereby incorporated by reference.

FIELD

This disclosure is related generally to network data transmission and more particularly to network data transmission timing.

BACKGROUND

Certain computing activities require a high precision clock that is distributed among a number of modules in a circuit, for example for high precision time stamping in a network device. High frequency clock signals offer suitable precision. However, the power cost of distributing a clock signal is related to its frequency.

The description above is presented as a general overview of related art in this field and should not be construed as an admission that any of the information it contains constitutes prior art against the present patent application.

SUMMARY

Systems and methods are provided for determining a clock time associated with an event at a higher precision than is attainable by a main clock signal. A system includes a plurality of processing modules distributed across an integrated circuit, a main clock signal being transmitted to ones of the plurality of processing modules at a main clock frequency. A plurality of sub-cycle frequency resolution modules are disposed in corresponding ones of the processing modules, the sub-cycle frequency modules generating sub-cycle phase indicators at a frequency that is greater than the main clock frequency, the sub-cycle frequency resolution modules being configured to receive the main clock signal and to determine a clock time of an event based on a combination of the main clock and the sub-cycle phase indicators. In an example, the processing modules are configured to time stamp data packets that are received and transmitted via a computer network.

As another example, a method for determining a clock time associated with an event at a higher precision than is attainable by a main clock signal of an integrated circuit includes transmitting a main clock signal having a main clock frequency to ones of a plurality of processing modules distributed across an integrated circuit. The sub-cycle frequency resolution modules are used to generate sub-cycle phase indicators at a frequency that is greater than the main clock frequency. A clock time of an event is determined at a higher precision than is attainable by the main clock signal at respective sub-cycle frequency resolution modules based on a combination of the main clock signal and the sub-cycle phase indicators.

DETAILED DESCRIPTION

Certain computing activities require high precision timekeeping for proper operation. For example, a precision time protocol (PTP) standard used for time stamping packets in Ethernet networks requires that a time stamp, or other suitable timing tag, be included with each packet of data indicating a time when that packet enters a port of an integrated circuit, such as a network bridge, router, switch etc., and when that packet exits a port of the integrated circuit, in one embodiment, such timing information is utilized by a system management module to determine delays attributable to different systems in a network, where those indicated delays are used to optimize network traffic routing. For example, in an embodiment, packet routing is adjusted responsively to delays that are determined based on time stamps that are appended to fields of a data packet. Certain precision time protocols require a high degree of precision for time stamping packets, such as on the magnitude of 1 nanosecond (ns), where that precision timekeeping is coordinated across the disparate network ports. A dedicated clock would need to run at 1 Gigahertz (GHz) or higher to provide such precision. Because required clock power is dependent on frequency (e.g., $P=C*V^2*F$, where P is required power, C is the clock network capacitance, V is the clock voltage, and F is the clock frequency), in certain embodiments, the distribution of a 1 GHz clock throughout a network device for time stamping would carry a substantial power cost.

Figure 1:
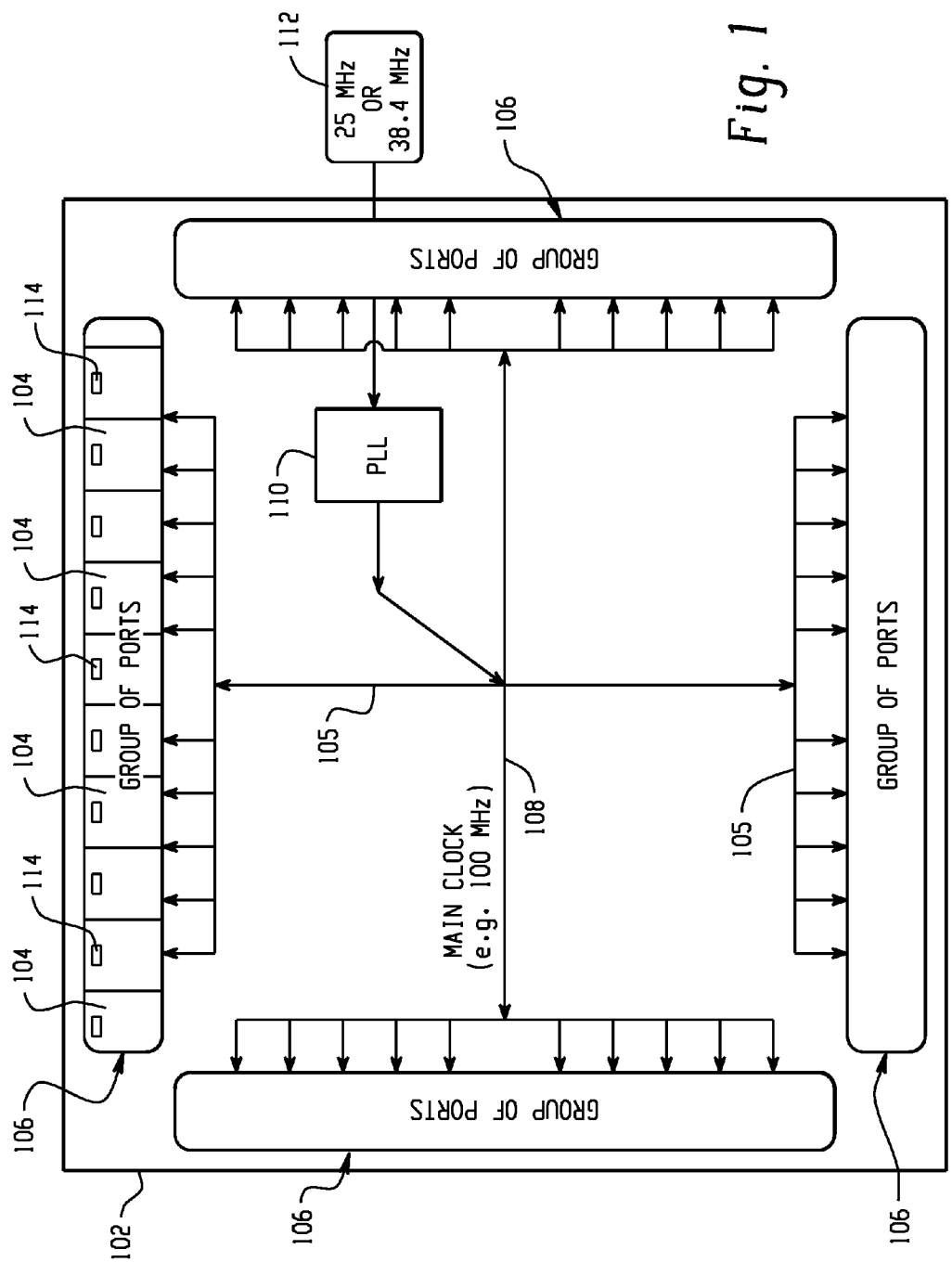
FIG. 1 is a diagram depicting a system for determining a clock time associated with an event at a higher precision than is attainable by a main clock signal.

FIG. 1 is a diagram depicting a system for determining a clock time associated with an event at a higher precision than is attainable by a main clock signal. FIG. 1 depicts an integrated circuit 102 that includes a plurality of processing modules in the form of network. ports 104. In the example of FIG. 1, the integrated circuit 102 includes groups of network ports 106, with each of the groups 106 including individual network ports 104 therein. A main clock signal 108 is provided to each of the network ports 104 via a clock distribution tree 105, in an embodiment. The main clock signal 108 is a relatively low frequency clock that is generated via a phase lock loop 110, a digital lock loop, or other suitable clock generator that receives a signal from an oscillator 112, in an embodiment. By using a relatively low frequency clock to provide the main clock signal 108, numerous design constraints for integrated circuit 102 are relieved.

In one embodiment, the main clock signal 108 is provided to each of the network. ports 104 to facilitate a precision time protocol, where data packets entering or leaving a network port 104 are tagged with a time stamp of entry and/or exit that is precise to within 1 ns (e.g., in accordance with a PTP standard). In that embodiment, the main clock signal 108 is provided at 100 MHz, for example, which on its own would only be capable of providing precision to within 10 ns. Additional precision is provided by a sub-cycle frequency resolution module 114 (also referred to as a time application interface) that is positioned locally at each of the network ports 104. A sub-cycle frequency resolution module 114 is configured to receive the main clock signal 108 and to determine a clock time of an event, such as a data packet ingressing to or egressing from the associated network port, at a higher precision than is attainable by the main clock frequency while maintaining synchronization with sub-cycle frequency resolution modules 114 of other network ports 104. The sub-cycle frequency resolution modules utilize local high resolution clock units, as described further herein, to keep time at the higher precision in synchronicity with one another despite independent operation of the sub-cycle frequency resolution modules 114 at different network ports 104. The sub-cycle frequency resolution modules keep time based on the main clock signal 108 input, which is common to each of the sub-cycle frequency resolution modules, enabling the sub-cycle frequency resolution modules to keep high resolution time in synchronicity. The heightened precision provided by the sub-cycle frequency resolution modules 114 is obtained in conjunction with a main clock signal 108 distributed across the integrated circuit 102 and having a lower frequency (e.g., 100 MHz versus 1 GHz), thereby resulting in a lesser power requirement for distributing the main clock signal 108.

Figure 2:
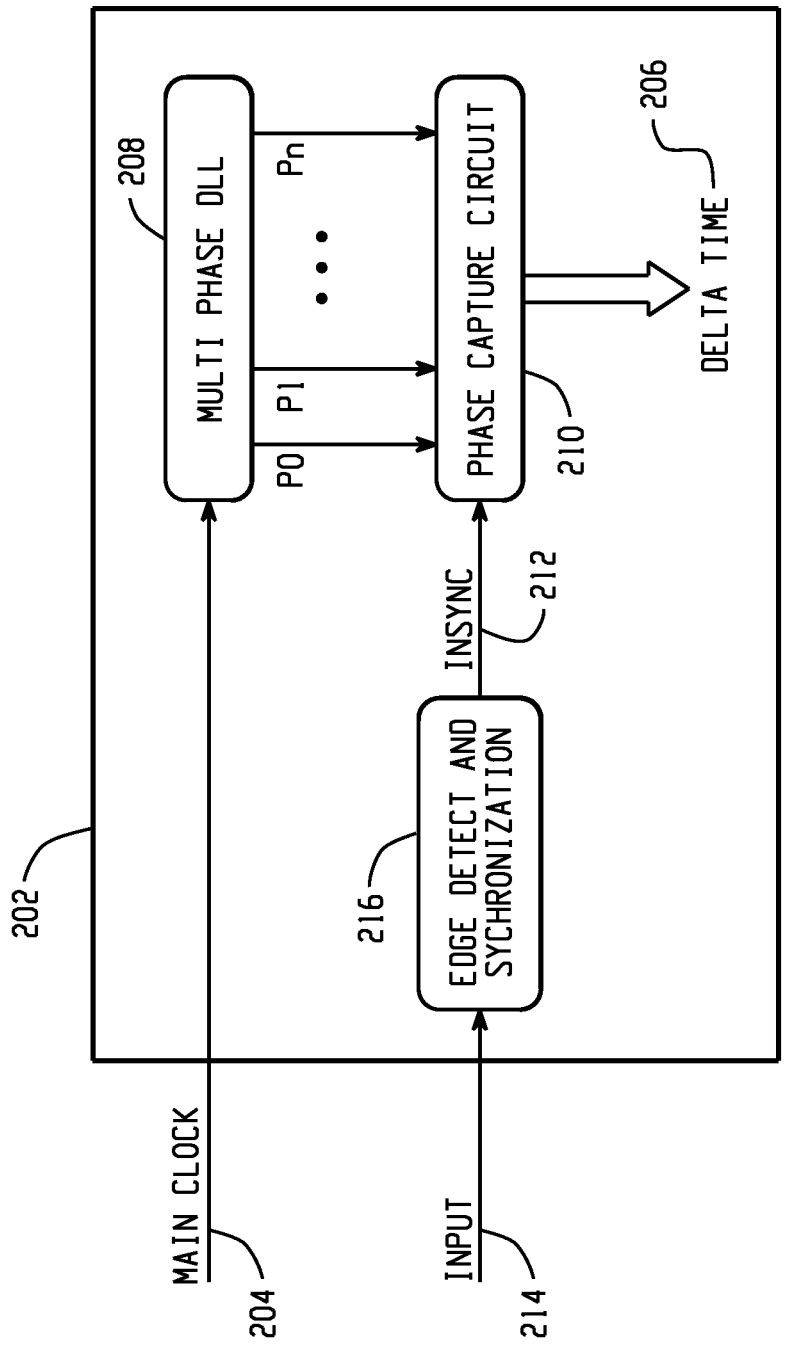
FIG. 2 is a block diagram depicting a sub-cycle frequency resolution module in one embodiment of the disclosure.

FIG. 2 is a block diagram depicting a sub-cycle frequency resolution module in one embodiment of the disclosure. The sub-cycle frequency resolution module 202 receives the main clock signal 204 and is configured to determine a delta time 206 between a rising edge of the main clock signal 20.4 and the occurrence of an event. The main clock signal 204 and the delta time signal 206 can then be used to calculate a clock time associated with the event at a higher precision than is attainable by the main clock signal alone. Such synchronicity can be advantageous in a variety of contexts. For example, in one embodiment where network data packets receive time stamps on entry to and upon exit from an integrated circuit, such synchronicity ensures accurate integrated circuit delay measurement when the data packet egresses from a different network port than the port at which it was ingressed to the integrated circuit.

In one embodiment of the disclosure, the sub-cycle frequency resolution module 202 includes a phase indicating circuit that is configured to receive the main clock signal 204 and to output a variable signal based on the main clock signal 204 in the form of sub-cycle phase indicators. In the example of FIG. 2, the phase indicating circuit comprises a multi-phase delay lock loop (multi-phase DLL) 208 that receives the in clock signal 204 and outputs one or more bits ($P_0, P^1, \ldots, P_n$) indicating a current phase of the input main clock signal 204 as the sub-cycle phase indicators. Thus, the multi-phase DLL 208 sub-cycle phase indicators vary multiple times within the span of a single period of the main clock signal 204 as the phase of the main clock signal 204 changes. In one example, the multi-phase DLL 208 indicates 10 different phases of a main clock signal 204 period. In other examples, the multi-phase DLL 208 indicates 8, 16, 32, or other suitable number of phases.

The sub-cycle frequency resolution module 202 further includes a phase capture circuit 210 that is configured to capture an output of the multi-phase DLL 208 phase indicating circuit based on a signal indicating an occurrence of the event. In the example of FIG. 2, the phase capture circuit 210 captures the bits outputted from the multi-phase DLL 208 based on insync signal 212, which is a processed form of input signal 214 that is asserted upon occurrence of the event. In one embodiment of the disclosure, the input signal 214 that is indicative of occurrence of the event (e.g., a packet entering a port of an integrated circuit) is provided to an edge detect and synchronization module 216 of the sub-cycle frequency resolution module 202 to detect the rising edge of the input signal 214 and synchronize an edge of processed signal 212 with the main clock 204. In operation, upon assertion of the input signal 214 and the corresponding rising edge of the insync signal 212 (e.g., within a few picoseconds of the assertion of the input signal 214), the phase capture circuit 210 captures the sub-cycle phase indicating output of the multi-phase DLL 208, which identifies where, within a single main clock period, the event occurred. This value corresponds within the amount of time from the rising edge of the main clock signal 204 marking the beginning of a new main clock signal period to the indication of the occurrence of the event. This delta time 206 in combination with the main clock signal 204 is utilized to determine a clock time associated with the occurrence of the event at a higher precision than could be provided by the main clock signal 204 alone.

Figure 3:
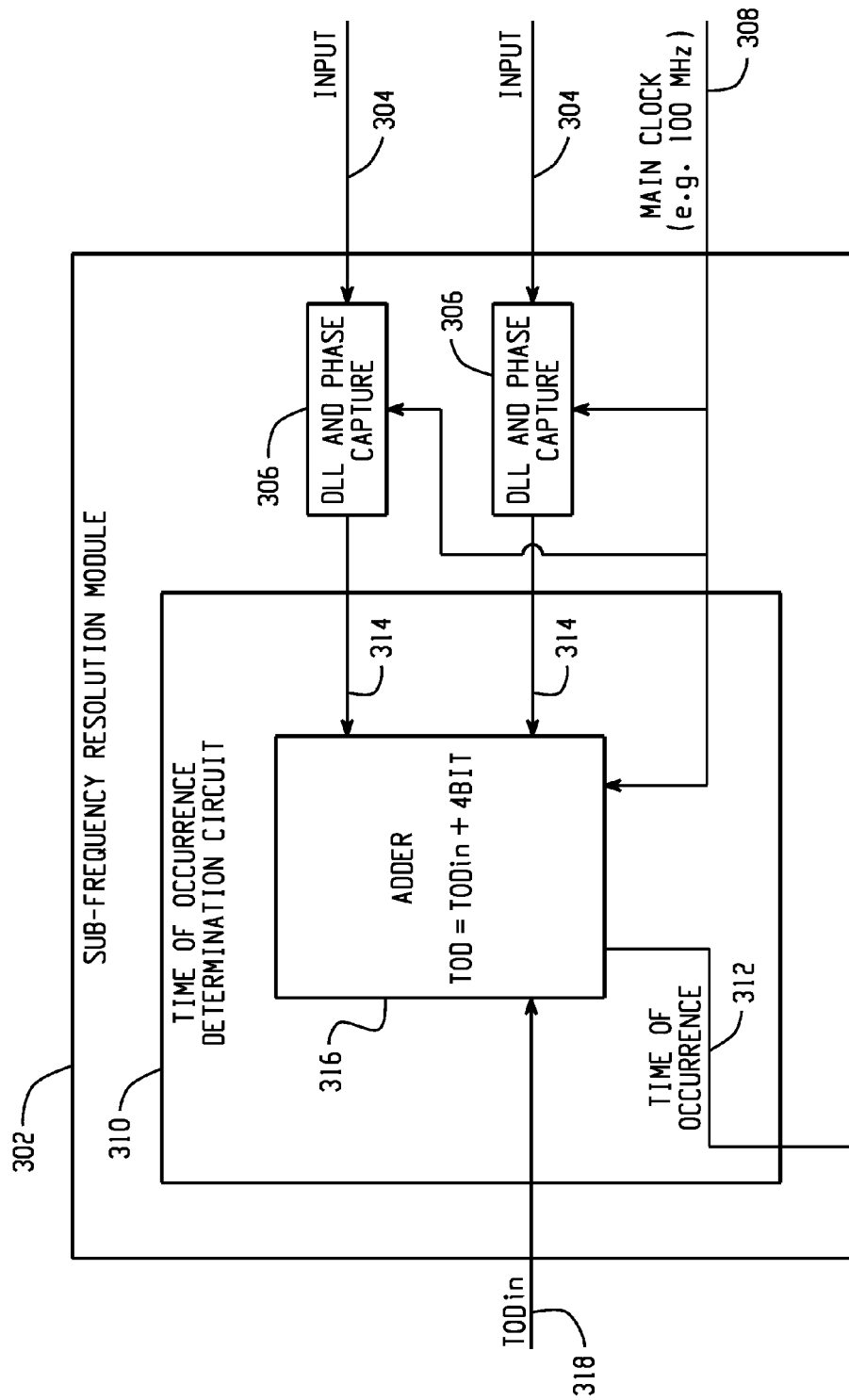
FIG. 3 is a block diagram depicting a sub-cycle frequency resolution module that includes a time of occurrence determination circuit.

FIG. 3 is a block diagram depicting a sub-cycle frequency resolution module that includes a time of occurrence determination circuit. The sub-cycle frequency resolution module 302 receives one or more input signals 304 that provide a signal indicating an occurrence of an event for which a time stamp is to be generated. An input signal 304 that is indicative of the occurrence of an event is provided to a DLL phase indicating circuit and phase capture module 306 (e.g., a module as described with respect to FIG. 2), which also receives a main clock signal 308. The phase indicating circuit of module 306 receives the main clock signal 308 and outputs a variable sub-cycle phase indicating signal that indicates a current phase of a cycle of the main clock signal 308. The phase capture circuit of module 306 is configured to capture an output of the phase indicating circuit based on receipt of the input signal 304 indicating an occurrence of the event. The example of FIG. 3 includes two DLL and phase capture modules 306 and associated inputs 304, which in one embodiment of the disclosure, are utilized for precision time of occurrence determination for occurrences of multiple events. In the example of FIG. 3, an assertion of either of the depicted inputs 304 results in determination of a time of occurrence 312 for the event that precipitated the assertion of that input 304.

The sub-frequency resolution module 302 of FIG. 3 further includes a time of occurrence determination circuit 310. The time of occurrence determination circuit 310 is configured to determine and output the time of occurrence of the event 312 based at least on the main clock signal 308 and the sub-cycle phase indicating signal from module 306, which is transmitted to the time of occurrence determination circuit 310 at 314. In one embodiment of the disclosure, the time of occurrence determination circuit 310 determines the time of occurrence of the event 312 using an adder 316. The adder 316 determines the time of occurrence of the event 312 by adding the delta time 314 indicated by the captured sub-cycle phase indicators received at 314 with the coarse time provided by the main clock signal 308 to provide the more precise time of occurrence 312 (e.g., by adding the delta time 314 to a coarse time indicated by the current cycle of the main clock signal 304 The time of occurrence 312 can be additionally augmented by an even more coarse time input, $TOD_{in}$ 318, which in one embodiment provides more coarse current time indications, such as date, hour, minute, etc. to which the precise time determined based on the main clock signal 308 and the sub-cycle phase indicators 314 is added. The time of occurrence 312 is outputted from the time of occurrence determination circuit 310 and the sub-frequency resolution module 302 for use by downstream circuitry.

Figure 4:
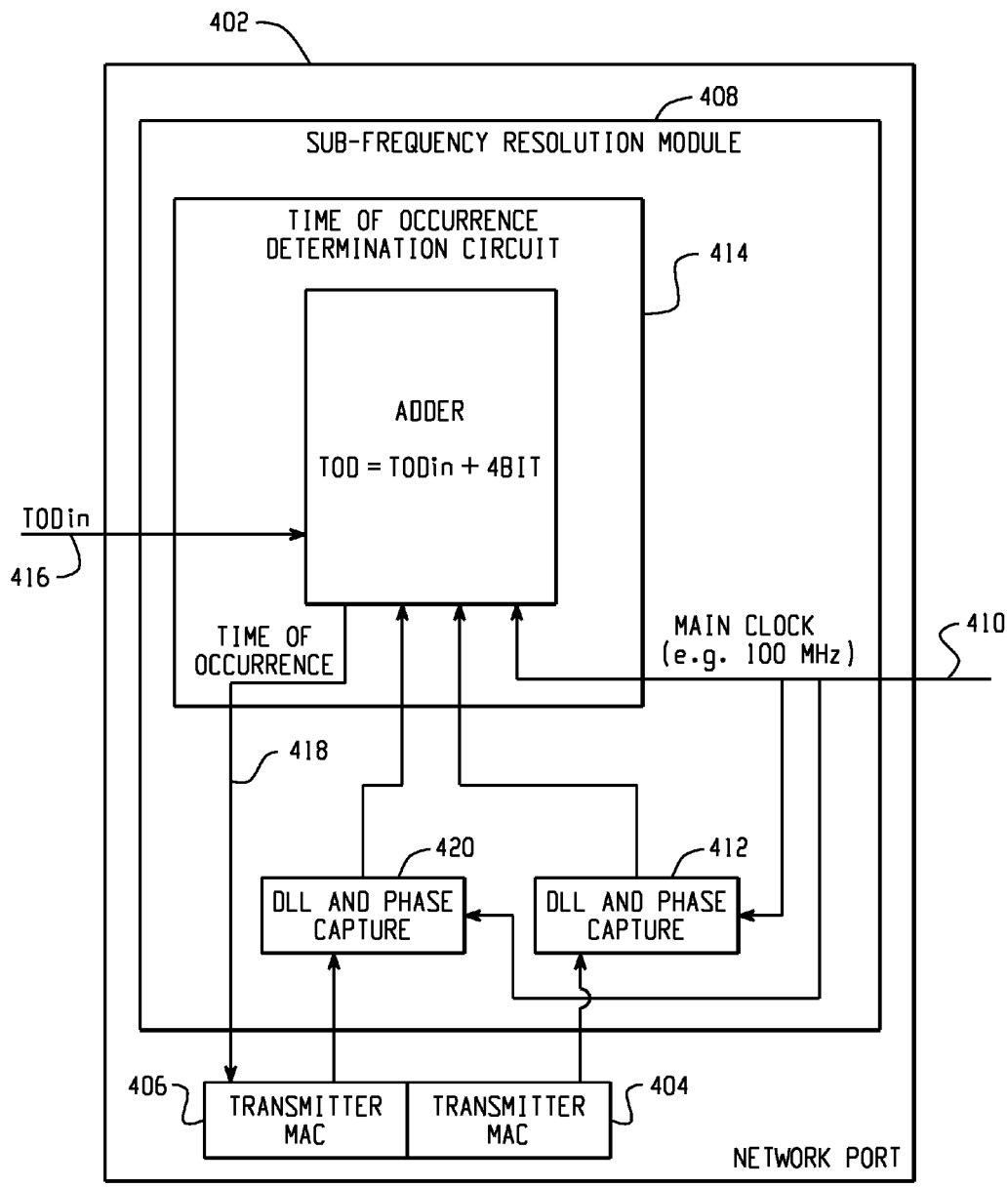
FIG. 4 is a block diagram depicting a sub-frequency resolution module configured to operate as a component of a network port.

FIG. 4 is a block diagram depicting a sub-frequency resolution module configured to operate as a component of a network port. A network port 402 includes a receiver MAC 404 and a transmitter MAC 406. Packets are received at the network port 402 of the integrated circuit at the receiver 404 and transmitted from the integrated circuit network port 402 via the transmitter 406. Each data packet processed by the integrated circuit is to have an indication of its time into the integrated circuit and time out of the integrated circuit incorporated into the data packet. To facilitate determination of the data packet in and data packet out times at a sufficient level of precision, the network port 402 includes a sub-frequency resolution module 408, which receives a main clock signal 410, such as from a main clock distribution tree.

Upon receipt of a data packet at the receiver 404 of the network port 402, a signal indicative of occurrence of the receiving event is transmitted to a DLL and phase capture module 412. The DLL and phase capture module 412 receives the main clock signal 410, which is provided to a phase indicating circuit that outputs a variable sub-cycle phase indicating signal based on the main clock signal 410. The DLL and phase capture module 412 further includes a phase capture circuit configured to capture the sub-cycle phase indicating output of the phase indicating circuit when the signal is received from the receiver indicating receipt of a data packet. A delay time indicated by the phase capture circuit is transmitted from the DLL and phase capture module, 412 to a time of occurrence determination circuit 414. The time of occurrence determination circuit 414 combines the fine grained time measurement from the DLL and phase capture module 412 with one or more of a time indicated by the main clock signal 410 and an external time of day input 416, such as by incorporating least significant bits (e.g., 4 bits) to a time of day value from the main clock 410 and/or the external time of day input 416, to determine a time of occurrence 418 that is appended to the data packet, such as upon transmission of the data packet from the network port 402 of the integrated circuit via transmitter 406.

In one embodiment of the disclosure, the sub-frequency resolution module 408 is configured to operate in a similar fashion to determine a time that a data packet is transmitted from the network port 402 of the integrated circuit. When a data packet is to be transmitted, an event occurrence signal is sent from the transmitter 406 to a second DLL and phase capture module 420 that operates in combination with the time of occurrence determination circuit 414 to determine a time of occurrence 418 of transmission of the data packet from the network port 402. This time of occurrence of transmission 418 is further incorporated into the data packet just prior to transmission.

Figure 5:
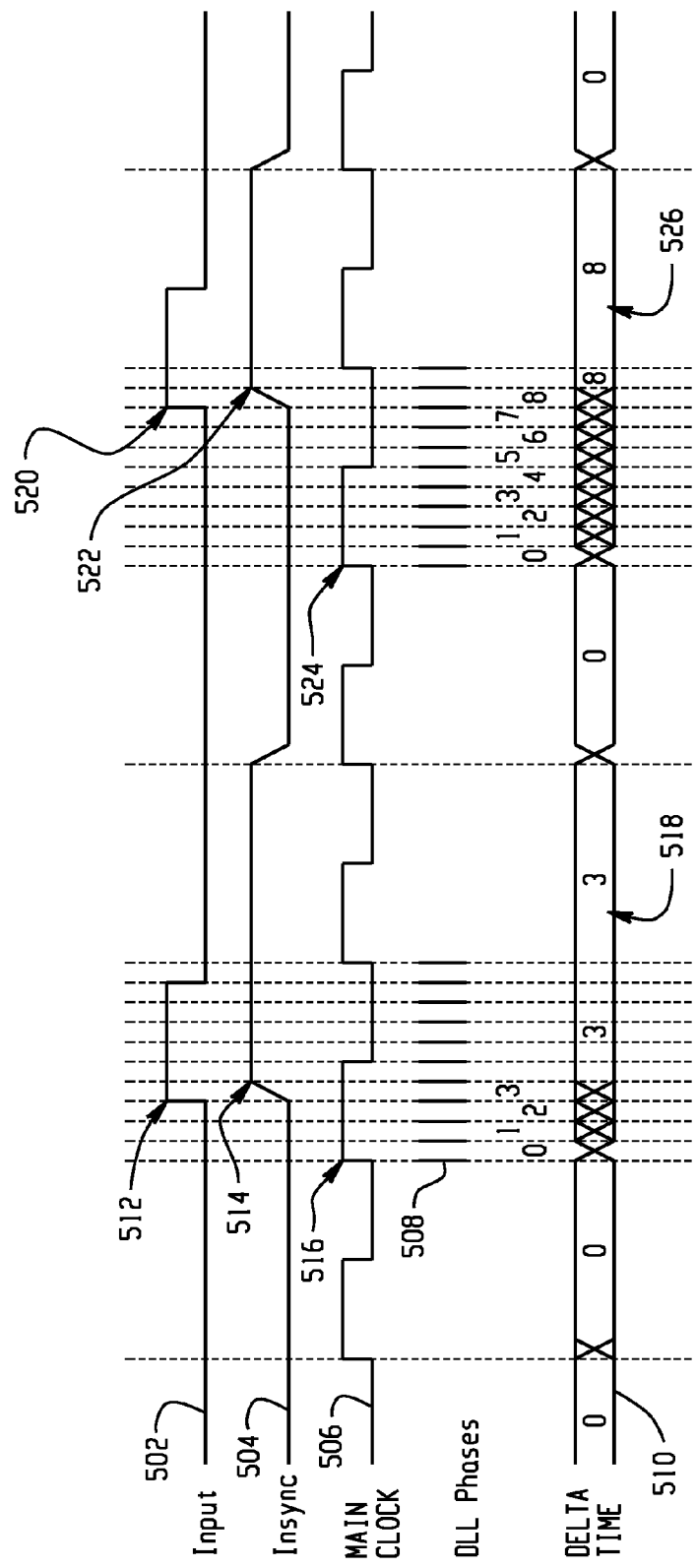
FIG. 5 is a timing diagram depicting example signals of a sub-cycle frequency resolution module.

FIG. 5 is a timing diagram depicting example signals of a sub-cycle frequency resolution module. A first input signal 502 is indicative of an occurrence of an event. An insync signal 504 is a processed form of the input signal 502 that rises upon detection of the input signal 502 and extends the length of the pulse that is provided to a phase capture circuit of the sub-cycle frequency resolution module. A main clock signal 506 is provided to the sub-cycle frequency resolution module. The main clock signal 506 (e.g., operating at 100 MHz) provides a coarse time indication.

DLL phase line 508 seen in FIG. 5 indicates the sub-cycle phase indicating outputs of a phase indicating circuit of the sub-cycle frequency resolution module in regions of interest. In the example of FIG. 5, the phase indicating circuit divides the period of the main clock signal 506 into ten parts, providing a varying sub-cycle phase indicating output that indicates the current phase of the main clock signal, A delta time 510 indicates a. time between the start of a main clock 506 period and an occurrence of an event, as indicated by the insync signal 504. The phase indicating circuit provides outputs at a granularity of 10 parts for each main clock period in the example of FIG. 5. A phase capture circuit of the sub-cycle frequency resolution module captures the sub-cycle phase indicating output of the phase indicating circuit at the time of an event, where that varying output is illustrated on line 508.

In a first example of FIG. 5, an input indicating an occurrence of an event is received at 512, and the insync signal 504 rises immediately afterwards at 514. The beginning of the most recent main clock signal 506 is indicated by the rising edge 516. The DLL phase indicating circuit begins counting phases (i.e., from 0 to 9) of the main clock signal 506 cycle from the beginning of clock period 516. The insync signal 504, which rises at 514, corresponds to phase 3 of the DLL phase indicating circuit. The phase capture circuit captures the phase indicating circuit's sub-cycle phase indicating output based on the insync signal 504 rising at 514, and at 518 outputs for the duration of the assertion of the insync signal 504 the value 3 as the delta time output 510. The output value 518 of delta time signal 510 is thus available for use by downstream circuitry. The combination of the main clock signal 506 and the delta time signal 518 are utilized to precisely determine the time of occurrence of the event, for example by applying the DLL phases to determine a precise time of the event to a sub-cycle frequency resolution of the main clock signal 506. In the first example of FIG. 5, one full cycle of the main clock signal 506 has occurred on the timeline prior to the sync signal 504 rising at 514, and phase 3 of the delta tune signal 518 indicates that 0.4 (4 ns) of an additional main clock signal 506 period had occurred at the time of insync signal 504 assertion. Thus, 0.4 main clock cycles have occurred from the beginning of the most recent main clock signal period from its rising edge to the assertion of the insync signal 504. The ability to determine main clock cycles to the 0.1 (1 ns) place improves the precision of timing, fora main clock signal 506 operating at 100 MHz, from 10 ns available for the main clock signal 506 alone to 1 ns for the main clock signal 506 operating in combination with the sub-cycle frequency resolution module. Where the power necessary to operate the sub-cycle frequency resolution modules is less than the power saved by operating the distributed main clock signal 506 at a lesser speed (e.g., 90% savings reducing main clock signal from 1 GHz to 100 MHz), required timing precision can be achieved at an overall power savings.

In a second example of FIG. 5, an input signal 502 is asserted at 520 followed by an immediate rise in the insync signal 504 at 522. The DLL phase indicating circuit indicates phase 8 of the main clock signal 506 since the beginning of the rising edge 524 of the main clock signal 506 when the insync signal 504 rises at 522, where that output, 8, is captured by the phase capture circuit and outputted at 526.

It is noted that in an embodiment this configuration facilitates significantly reducing the frequency of the main clock which is distributed across the integrated circuit, to save power for example, while maintaining synchronization among different modules based on the common main clock signal input to each of the sub-cycle frequency resolution modules and without forfeiting the precision that would be afforded by a higher frequency clock.

Figure 6:
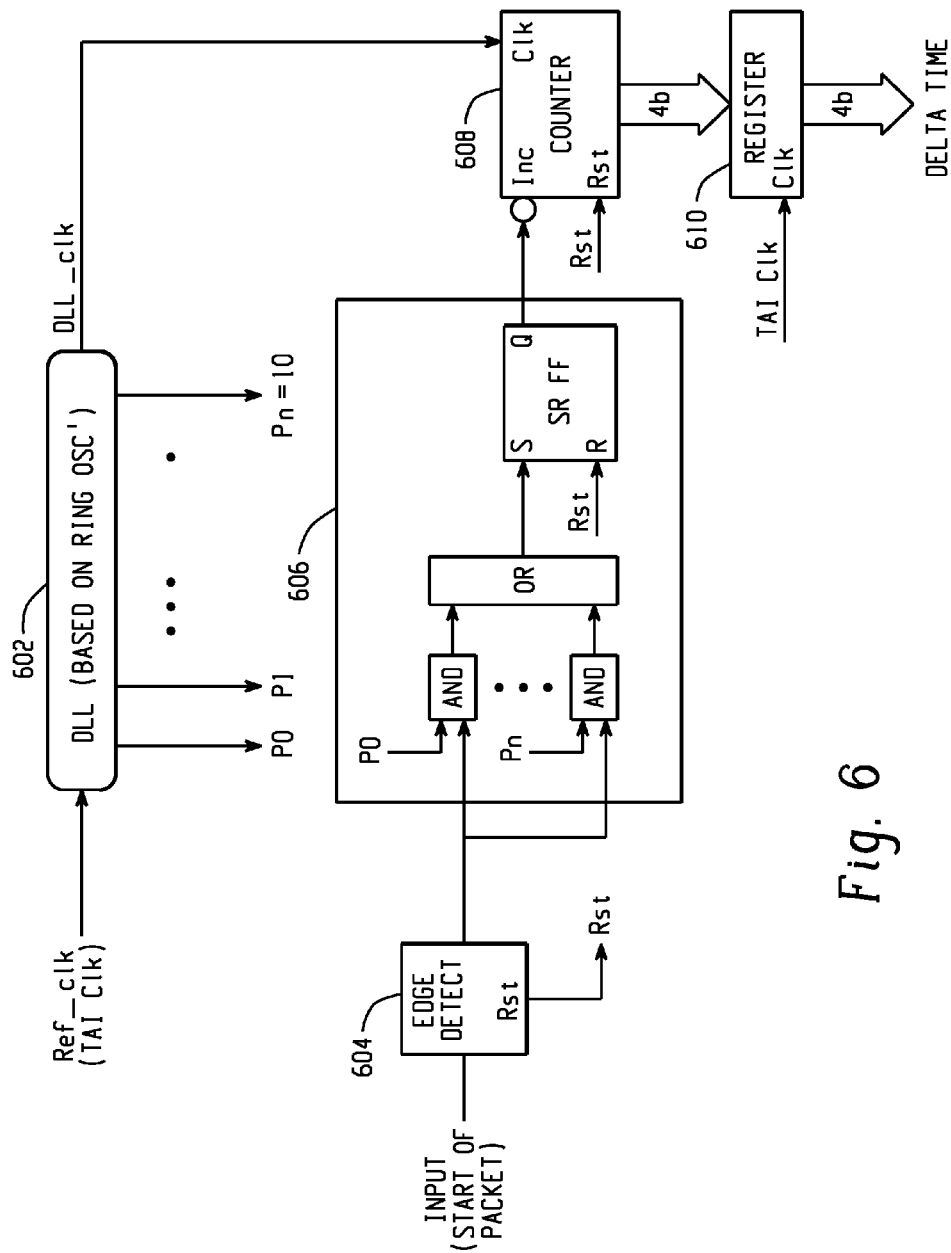
FIG. 6 is block diagram depicting example logic of a sub-cycle frequency resolution module.

FIG. 6 is block diagram depicting example logic of a sub-cycle frequency resolution module. A reference clock (e.g., a main clock signal) is provided to a DLL phase indicating circuit 602 that outputs one or more varying signals based on the reference clock. An input signal indicating the receipt of a packet is processed by an edge detect module 604 that outputs a processed indicator of occurrence of the event, such as the insync signal described above. Upon assertion of the signal from the edge detect module 604, a collection of logic gates and a flip flop detects and captures the output of the DLL phase indicating circuit 602 at the time of occurrence of the event. A counter 608 and register 610 provide the delta time value that indicates a fractional portion of a reference clock cycle that had occurred when the event occurrence signal was received.

Figure 7:
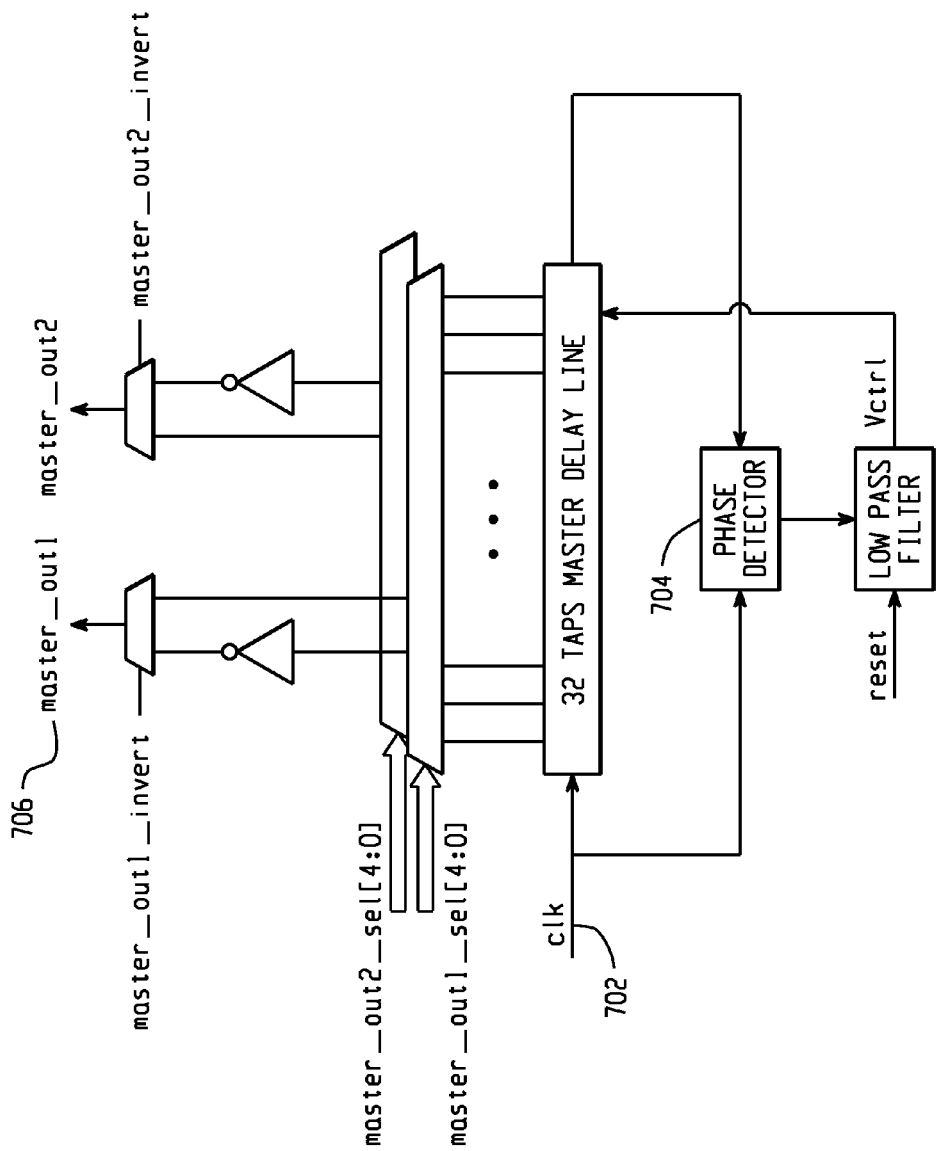
FIG. 7 is a block diagram depicting an example ring oscillator DLL in accordance with one embodiment of the disclosure.

As mentioned above, when all of the sub-cycle frequency resolution modules of an integrated circuit can be operated at less total power than the power saved by operating the main clock signal, which is distributed across the integrated circuit, at a lower frequency, then an overall power savings for the integrated circuit can be achieved. In one embodiment of the disclosure, the phase indicating circuit of the sub-cycle frequency resolution modules comprises a delay lock loop implemented using a ring oscillator that includes a plurality of serially connected inverters, which have a small power and area footprint. FIG. 7 is a block diagram depicting an example of a ring oscillator DLL in accordance with one embodiment of the disclosure. In FIG. 7, a main clock signal is inputted to the ring oscillator DLL at 702. A phase detector 704 is configured to break the period of the main clock signal 702 into a plurality of even length blocks. In the example of FIG. 7, the period of the main clock signal 702 is broken into 32 blocks. Outputs 706 of the ring oscillator DLL are varied as each block of time representing a 1/32 fraction of the period of the main clock signal elapses. In the example of FIG. 7, the outputs cycle from 0 to 31 during each cycle of the main clock signal 702.

Figure 8:
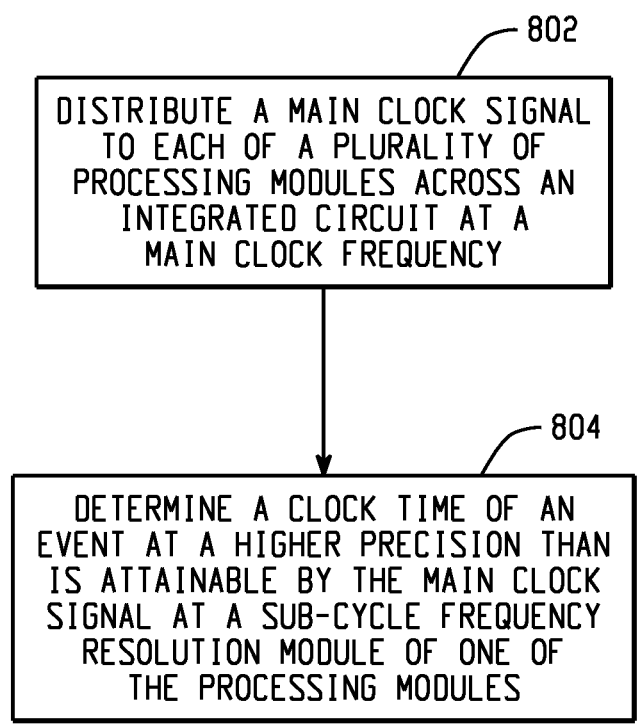
FIG. 8 is a flow diagram depicting a method for determining a clock time associated with an event at a higher precision than is attainable by a main clock signal.

FIG. 8 is a flow diagram depicting a method for determining a clock time associated with an event at a higher precision that is attainable by a main clock signal of an integrated circuit. At 802, a main clock signal having a main clock frequency is transmitted to ones of a plurality of processing modules distributed across an integrated circuit, The main clock signal is used to generate sub-cycle phase indicators at a frequency that is greater than the main clock frequency at a sub-cycle frequency resolution module of one of the processing modules. At 804, a clock time of an event is determined at a higher precision than is attainable by the main clock signal at the sub-cycle frequency resolution module based on a combination of the main clock signal and the sub-cycle phase indicators.

This application uses examples to illustrate the invention. The patentable scope of the invention includes other examples. For example, in one embodiment, the output of the phase lock loop 108 of FIG. 1 is also used to generate a system clock that is provided to modules of the integrated circuit 102 for executing processing functions, where the system clock operates at a different frequency than the main clock 108. In other embodiments, the system clock is provided by separate hardware.

It is claimed:

1. A network device comprising:
 a plurality of network ports distributed across a single integrated circuit device, ones of the network ports being physically separated from each other within the single integrated circuit device, a main clock signal being distributed to the plurality of network ports at a main clock frequency, and
 a plurality of sub-cycle frequency resolution modules disposed within the single integrated circuit device at or in proximity to corresponding ones of the network ports, the sub-cycle frequency modules generating sub-cycle phase indicators that change multiple times within a single period of the main clock signal at a frequency that is greater than the main clock frequency, a sub-cycle frequency resolution module of a respective network port being configured to receive the main clock signal and to determine a clock time for occurrence of a local event at the respective network port based on a combination of the main clock and a subset of the sub-cycle phase indicators indicative of the occurrence of the local event, the determined clock time for the event being used to time stamp a data packet with a timing indicator that is generated at a precision that is higher than is attainable by the main clock signal alone.

2. The network device of claim 1, wherein the sub-cycle frequency resolution module of the respective network port comprises:
 a phase indicating circuit configured to receive the main clock signal and to output the sub-cycle phase indicators that are indicative of a phase of the main clock signal;
 a phase capture circuit configured to capture the sub-cycle phase indicators of the phase indicating circuit based on a signal indicating an occurrence of the local event; and
 a time of occurrence determination circuit configured to determine the clock time of the local event based on the main clock signal and the captured sub-cycle phase indicators.

3. The network device of claim 2, wherein the phase indicating circuit comprises a delay lock loop that is configured to output the sub-cycle phase indicators that vary to indicate a current phase of the main clock signal.

4. The network device of claim 2, wherein the time of occurrence determination circuit comprises an adder circuit that is configured to receive a time of day signal, wherein the time of occurrence determination circuit is further configured to determine the clock time of the local event by adding an amount of time to the time of day signal based on the main clock signal and the sub-cycle phase indicators.

5. The network device of claim 2, wherein the system is configured to incorporate the clock time of the local event into a field of a data packet received from or transmitted to a network.

6. The network device of claim 5, wherein the field of the data packet indicates a time that the data packet ingresses to the single integrated circuit device or a time that the data packet egresses from the single integrated circuit device.

7. The network device of claim 5, wherein the field of data is associated with a precision time protocol (PTP) that requires that the clock time of the local event in the field of the data packet be at a higher precision than is attainable by the main clock signal alone.

8. A network device of claim 5, wherein the field of the data packet is updated to include the clock time of the data packet ingresses to the respective network port or egresses from the respective network port.

9. The network device of claim 2, wherein the main clock signal is generated from a phase lock loop and is provided over a clock distribution tree to plural ones of the plurality of network ports.

10. The network device of claim 9, wherein the phase lock loop is positioned at a different location on the single integrated circuit device from the phase indicating circuits of the sub-cycle frequency resolution modules.

11. The network device of claim 1, wherein the plurality of sub-cycle frequency resolution modules operate independently of one another, wherein clock time is determined by a combination of the main clock signal and the sub-cycle frequency resolution modules such that generated clock time determined at different network ports is determined in synchronicity.

12. A method for determining a clock time of an event at a network device, the method comprising:
distributing, over a clock distribution tree to a plurality, of network ports distributed across a single integrated circuit device, ones of the network ports being physically separated from each other within the single integrated circuit device, a main clock signal having a main clock frequency;
generating, at a sub-cycle frequency resolution module disposed within the single integrated circuit device at or in proximity to a corresponding one of the network ports, sub-cycle phase indicators indicative of a sub-cycle phase of the main clock signal, the sub-cycle phase indicators changing multiple times within a single period of the main clock signal and being generated at a frequency that is greater than the main clock frequency;
determining, at the sub-cycle frequency resolution module, a clock time based on a combination of the main clock signal and a subset of the sub-cycle phase indicators that are indicative of occurrence of a local event at one of the network ports, the clock time corresponding to the occurrence of the local event at the one of the network ports and being at a precision that is higher than the precision attainable by the main clock signal; and
time stamping data packets with a tag indicative of the determined clock time for occurrence of the local event.

13. The method of claim 12, wherein determining the clock time of the local event further comprises:
providing the main clock signal to a phase indicating circuit of the sub-cycle frequency resolution module;
capturing the sub-cycle phase indicators based on an indication of occurrence of the local event; and
determining the clock time of the local event based on the main clock signal and the captured sub-cycle phase indicators.

14. The method of claim 13, further comprising receiving a time of day signal, wherein determining the clock time of the local event further comprises:
adding an amount of time to the time of day signal based on the main clock signal and the sub-cycle phase indicators.

15. The method of claim 13, wherein capturing the sub-cycle phase indicators comprises capturing the sub-cycle phase indicators from a delay lock loop that outputs varying sub-cycle phase indicators respective to a current phase of the main clock signal.

16. The method of claim 12, further comprising:
incorporating the clock time of the local event into a field of a data packet.

17. The method of claim 16, further comprising:
incorporating the clock time of the local event into a field of the data packet to indicate a time that the data packet ingresses to the single integrated circuit device or to indicate a time that the data packet egresses from the single integrated circuit device.

18. The method of claim 16, wherein incorporating the clock time of the local event into a field according to a precision time protocol (PTP) that requires that the clock time of the local event in the field of the data packet be at a higher precision than is attainable by the main clock signal alone.

19. The method of claim 18, further comprising:
adjusting routing of data packets based on the clock time of the local event in the field of the data packet.

* * * * *